(12) United States Patent
Slawinski

(10) Patent No.: US 8,546,496 B2
(45) Date of Patent: Oct. 1, 2013

(54) PROCESS FOR PREPARING A BIMODAL POLYETHYLENE PRODUCT IN A SINGLE LOOP REACTOR

(75) Inventor: Martine Slawinski, Nivelles (BE)

(73) Assignee: Total Research & Technology Feluy, Seneffe, (Feluy) (BE)

( * ) Notice: Subject to any disclaimer, the term of this patent is extended or adjusted under 35 U.S.C. 154(b) by 13 days.

(21) Appl. No.: 13/514,087

(22) PCT Filed: Dec. 17, 2010

(86) PCT No.: PCT/EP2010/070015
§ 371 (c)(1),
(2), (4) Date: Jun. 6, 2012

(87) PCT Pub. No.: WO2011/073365
PCT Pub. Date: Jun. 23, 2011

(65) Prior Publication Data
US 2012/0252988 A1    Oct. 4, 2012

(30) Foreign Application Priority Data
Dec. 18, 2009    (EP) .................................. 09179790

(51) Int. Cl.
*C08F 2/12*    (2006.01)
*C08F 4/02*    (2006.01)
*C08F 4/648*    (2006.01)
*C08F 10/02*    (2006.01)

(52) U.S. Cl.
USPC .............. 526/64; 526/129; 526/908; 526/909

(58) Field of Classification Search
USPC .................................... 526/64, 908, 129, 909
See application file for complete search history.

(56) References Cited

U.S. PATENT DOCUMENTS

| | | |
|---|---|---|
| 6,218,330 B1 | 4/2001 | Razavi et al. |
| 7,384,884 B2 * | 6/2008 | Wenzel et al. ................ 502/110 |
| 2005/0065298 A1 * | 3/2005 | Dekmezian et al. .......... 526/119 |
| 2006/0068985 A1 | 3/2006 | Razavi |
| 2008/0108766 A1 | 5/2008 | Razavi |

* cited by examiner

Primary Examiner — Fred M Teskin

(57) ABSTRACT

The present invention relates to a process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a porous support wherein said metallocene comprises only one transition metal. Said polymerization catalyst consists of two physically different fractions of support particles onto which said metallocene-alumoxane catalyst is immobilized.

13 Claims, No Drawings

PROCESS FOR PREPARING A BIMODAL POLYETHYLENE PRODUCT IN A SINGLE LOOP REACTOR

CROSS-REFERENCE TO RELATED APPLICATIONS

This application claims the benefit of PCT/EP2010/070015, filed Dec. 17, 2010, which claims priority from EP 09179790.2, filed Dec. 18, 2009.

TECHNICAL FIELD OF THE INVENTION

The present invention relates to a process for preparing a bimodal polyethylene resin in a single loop reactor in the presence of a single polymerization catalyst, wherein said polymerization catalyst is a single site polymerization catalyst. Preferably said polymerization catalyst consists of a metallocene-alumoxane catalyst immobilized on a porous inorganic support. Said polymerization catalyst consists of two fractions of support particles, and in particular two fractions that have different physical properties, onto which said metallocene-alumoxane catalyst is immobilized.

BACKGROUND OF THE INVENTION

Polyethylene resins having bimodal characteristics include resins that comprise two components having different properties, such as for instance two components of different molecular weight, i.e. a component with a relatively higher molecular weight component (HMW) and a component with a lower molecular weight (LMW) component; two components of different densities; and/or two components having different productivities or reaction rates with respect to co-monomer.

The use of metallocene catalysts in the polymerization process or copolymerization process of ethylene is a relatively recent development. Processes for producing bimodal polyolefins in general and bimodal polyethylene in particular in the presence of metallocene catalysts have been described.

Bimodal polyethylene resins can be prepared according to different methods. Bimodal polyethylene products can for instance be made by physically blending different monomodal polyolefin products which are independently produced. However, a problem with those physically produced bimodal products is that they usually contain high levels of gels.

Alternatively, bimodal polyethylene can also be prepared by sequential polymerization in two separate reactors that are serially interconnected. In such sequential polymerization process in one reactor, one of the two components of the bimodal blend is produced under a set of conditions maintained in the first reactor, and transferred to a second reactor, where under a set of conditions different from those in the first reactor, the second component is produced having properties (e.g. molecular weight, density, etc.) different from the first component.

However, using metallocene-based catalyst systems to catalyze the preparation of bimodal polyethylene in serially connected reactors, results in polymer fractions that may be difficult to mix with one another. A problem associated with known bimodal polyethylene products is that if the individual polyethylene components are too different in molecular weight and density, they may not be homogeneously mixed with each other as desired. As a consequence harsh extrusion conditions or repeated extrusions are sometimes necessary which might lead to partial degradation of the final product and/or additional cost. Thus the optimum mechanical and processing properties are not achieved in the final polyolefin product. Also, bimodal polymer particles produced may not be sufficiently uniform in size, and hence segregation of polymer during storage and transfer can produce non-homogeneous products.

Another technique for preparing bimodal polyethylene consists of preparing bimodal polyethylene resins in a single reactor. Production of polyethylene with a bimodal molecular weight distribution (MWD) in a single reactor has long been a goal of the polyolefin industry because single reactor configurations are significantly cheaper to build, have improved operability, and enable quicker product transitions than multi-reactor configurations. A single reactor can also be used to produce a broader range of products than a set of cascaded reactors can do.

Bimodal polyethylene resins can be prepared in a single reactor by employing two distinct and separate catalysts in a same reactor each producing a polyethylene component having certain properties. In an example, bimodal polyethylene can be produced by combining two different single site catalysts in a single reactor, as is described for instance in WO 2006/045738.

In another example, WO 95/11264 discloses a process for the preparation of polyethylene blends comprising a high molecular weight component and low molecular weight component. The catalyst system used in this process contains two different transition metals, one of which is a metallocene, and one of which is a non-metallocene. The resulting blends embrace a broad spectrum of product compositions, determined by the weight fractions and molecular weights of the individual components.

Alternatively, a single dual site catalyst system can be used to produce bimodal polyethylene in a single reactor, as is described for instance in WO 2004/029101.

However, a problem of bimodal polyethylene preparation in a single reactor, is that the catalysis reaction may be difficult to control, and that highly sophisticated catalytic systems are required.

In view of the above, there remains a need in the art to provide an improved method for preparing a bimodal polyethylene product with improved control and convenience in a single reactor. It is in particular desirable to find ways of making homogeneous bimodal polyethylene in a single reactor having desired and controllable properties.

SUMMARY OF THE INVENTION

The present invention provides an improved method for catalytically preparing a bimodal polyethylene product having bimodal characteristics in a single loop reactor. In accordance with the present invention catalysis reaction in said loop reactor is based on the use of a single polymerization catalyst, which is a single site polymerization catalyst, and in particular a metallocene-based catalyst.

In particular, the invention relates in a first aspect to a process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a particulate porous support, wherein said metallocene comprises only one transition metal, wherein said particulate porous support consists of a first fraction support and a second fraction support, and wherein said first fraction support differs from said second fraction support in at least one physical parameter.

In a preferred embodiment, the invention provides a process wherein said support is a particulate porous silica support.

In an embodiment, a process is provided wherein said first fraction support differs from said second fraction support in at least one physical parameter selected from the group comprising median particle diameter, average pore diameter, average pore volume, and surface area.

In another embodiment, the invention also provides a process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a particulate porous support, wherein said metallocene comprises only one transition metal, wherein said polymerization catalyst consists of a first fraction catalyst and a second fraction catalyst, and wherein said first fraction catalyst differs from said second fraction catalyst in at least one physical parameter, and in particular in median particle diameter.

Unexpectedly, the Applicants have shown that even if the process is based on the use of a single polymerization catalyst having only one kind of catalytically active site, the present process still permits to prepare in a single reactor polymer products having desired and controllable bimodal properties. Moreover, in accordance with the present invention, an improved method for preparing bimodal polyethylene product is provided, wherein the bimodal characteristics of the polyethylene product can be steered based on the physical properties of the catalyst and its support, and in particular by controlling the properties and structure of the catalyst and its support including catalyst and support morphology and granulometry, without changing the catalytically active site of said catalyst. The present invention permits to tailor the properties of the bimodal polyethylene products for instance with respect to molecular weight, density, weight fractions, co-monomer incorporation, etc. to obtain bimodal polyethylene products having excellent properties.

Furthermore, as a result of catalysis in a single reactor the product has greatly improved inter particle composition homogeneity. This is because the catalyst itself provides sites for catalysis of each of the components, in the constant process conditions and environment of one reactor. Also, producing bimodal polyethylene products in a single reactor relieves the necessity of a separate blending step, and allows the products to be produced more quickly and efficiently at a lower production cost.

In another aspect, the invention relates to a bimodal polyethylene product obtainable or obtained by carrying out the process according to the present invention. The polyethylene product which is produced according to the invention is a bimodal polyethylene product, comprising two different polyethylene fractions, of which the properties may be tailored in accordance with the present process by selection of the properties of the polymerization catalyst. The two different polyethylene fractions may inter alia be characterized by a different average or median molecular weight, different densities, different co-monomer introduction, different polydispersity, different stereospecificity, etc.

In a preferred embodiment, a process is provided, wherein said metallocene has formula (I) or (II)

$$(Ar)_2MQ_2 \quad (I)$$

for non-bridged metallocenes; or $$(II) \quad R''(Ar)_2MQ_2$$

for bridged metallocenes
wherein each Ar is independently selected from the group consisting of cyclopentadienyl, indenyl, tetrahydroindenyl, and fluorenyl; and wherein Ar is optionally substituted with one or more substituents each independently selected from the group consisting of halogen, a hydrosilyl, a $SiR_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;
wherein M is a transition metal selected from the group consisting of titanium, zirconium, hafnium and vanadium;
wherein each Q is independently selected from the group consisting of halogen; a hydrocarboxy having 1 to 20 carbon atoms; and a hydrocarbyl having 1 to 20 carbon atoms wherein said hydrocarbyl optionally contains one or more atoms selected from the group comprising B, Si, S, O, F, Cl and P;
wherein R" is a bridge between the two Ar and selected from the group consisting of a $C_1$-$C_{20}$ alkylene, a germanium, a silicon, a siloxane, an alkylphosphine and an amine, wherein said R" is optionally substituted with one or more substituents each independently selected from the group consisting of halogen, a hydrosilyl, a $SiR_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P.

In another embodiment, a process is provided wherein said alumoxane has formula (III) or (IV)

$$R\text{—}(Al(R)\text{—}O)_x\text{—}AlR_2 \quad (III)$$

for oligomeric, linear alumoxanes; or $$(\text{—}Al(R)\text{—}O\text{—})_y \quad (IV)$$

for oligomeric, cyclic alumoxanes
wherein x is 1-40, y is 3-40, and each R is independently selected from a $C_1$-$C_8$ alkyl.

In a preferred embodiment, M is zirconium. In other words, in a preferred embodiment, said metallocene comprises the transition metal zirconium.

In another preferred embodiment, said alumoxane is methylalumoxane.

With the insight to better show the characteristics of the invention, some preferred embodiments are described hereafter.

DETAILED DESCRIPTION OF THE INVENTION

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention is directed to a process for preparing in a single reactor bimodal polyethylene products, having controllable bimodal characteristic, based on the use of a single heterogeneous polymerization catalyst, wherein said polymerization catalyst is a single site polymerization catalyst, and in particular a polymerization catalyst comprising a single transition metal which preferably is titanium, zirconium, hafnium or vanadium.

The term "single" as used in single polymerization catalyst intends to refer to a single metallocene-based catalyst. In other words, the present polymerization process is carried out in the presence of one type of catalyst: all catalyst particles comprise the same metallocene and alumoxane components and a support having the same chemical elements, e.g. silica.

The term "heterogeneous" as used in heterogeneous polymerization catalyst refers to the fact that the polymerization catalyst according to the invention comprises a distribution of particles which all comprise the same metallocene and alumoxane components and a support having the same chemical elements (e.g. silica), but which have different physical properties.

The term "physical" or "physical properties" is used herein to refer to properties or parameters of the polymerization catalyst, but is not intended to refer to the chemical elements making up the catalyst.

The term "single-site" polymerization catalyst in the present context intends to refer to a polymerization catalyst having only one type of catalytically active site.

In accordance with the invention, bimodal polyethylene product can be prepared using a polymerization catalyst that essentially consists of two fractions having a same type of catalytically active site, which are physically different and/or which have physically different supports.

The polymerization reaction as described above is carried out in a loop reactor using any suitable, conventional olefin polymerization process, such as under slurry conditions, with the produced polymer usually in a form of solid particles which are suspended in a diluent. The reaction is conducted substantially in the absence of catalyst poisons, such as moisture, with a catalytically effective amount of the catalyst at a suitable reaction temperature and pressure. More in particular, the invention relates to a process for preparing a bimodal polyethylene product in a single loop reactor, comprising the steps of:

(a) feeding ethylene monomer, a liquid hydrocarbon diluent, optionally hydrogen, and optionally one or more olefin co-monomers into said loop reactor;
(b) feeding a single heterogenous polymerization catalyst into said loop reactor;
(c) polymerizing said ethylene monomer and said optionally one or more olefin co-monomers to produce a slurry of bimodal polyethylene product in said diluent in said loop reactor;
(d) allowing said slurry to settle into one or more settling legs connected to said loop reactor;
(e) discharging the settled slurry from said one or more settling legs out of said loop reactor;

wherein said single heterogeneous polymerization catalyst consists of a metallocene-alumoxane catalyst immobilized on a porous support, wherein said metallocene comprises only one transition metal, wherein said particulate porous support consists of a first fraction support and a second fraction support, and wherein said first fraction support differs from said second fraction support in at least one physical parameter.

In another embodiment, the invention also provides a process for preparing a bimodal polyethylene product in a single loop reactor as given above, wherein said single heterogeneous polymerization catalyst consists of a metallocene-alumoxane catalyst immobilized on a porous support, wherein said metallocene comprises only one transition metal, wherein said polymerization catalyst consists of a first fraction catalyst and a second fraction catalyst, and wherein said first fraction catalyst differs from said second fraction catalyst in at least one physical parameter.

"Bimodal polyethylene" or "bimodal polyethylene product" as used herein refers to a bimodal polyethylene resin comprising two components having different properties, such as for instance two components of different molecular weight; two components of different densities; and/or two components having different productivities or reaction rates with respect to co-monomer. In an example one of said fractions has a higher molecular weight than said other fraction. In another example, one of said fractions has a higher density than said other fraction. However, the invention is not limited to the regulation of bimodal molecular weights or densities only, but may be used for bimodal regulation of other aspects of resin products, such as, but not limited to, co-monomer introduction, polydispersity, stereospecificity, etc.

The recovered product is a granular bimodal polyethylene product, also named particulate bimodal polyethylene product. The term "particulate" in the present context intends to refer to particles.

The above-defined bimodal polyethylene product can then be supplied to an extruder, optionally in combination with one or more additives, such as but not limited to antioxidants, anti-UV agents, anti-static agents, dispersive aid agents, processing aids, colorants, pigments, etc. The total content of these additives does generally not exceed 10 parts, preferably not 5 parts, by weight per 100 parts by weight of the final extruded product.

In a preferred embodiment, ethylene polymerization includes but is not limited to homopolymerization of ethylene, copolymerization of ethylene and a higher 1-olefin co-monomer such as 1-butene, 1-pentene, 1-hexene, 1-octene or 1-decene. In a particularly preferred embodiment of the present invention, said co-monomer is 1-hexene.

In accordance with the invention, ethylene polymerizes in a liquid diluent in the presence of a polymerisation catalyst as defined herein, optionally a co-monomer, optionally hydrogen and optionally other additives, thereby producing polymerization slurry comprising bimodal polyethylene.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, in the present case bimodal polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable diluents are well known in the art and include but are not limited to hydrocarbon diluents such as aliphatic, cycloaliphatic and aromatic hydrocarbon solvents, or halogenated versions of such solvents. The preferred solvents are 012 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used the person skilled in the art will appreciate that the nature, amounts and concentrations of the above given monomers, co-monomers, polymerisation catalyst, and additional compounds for the polymerization as well as the polymerization time and reaction conditions in the reactor can vary depending on the desired bimodal polyethylene product.

The present process is based on the polymerisation of ethylene monomer in the presence of a single heterogeneous polymerization catalyst consisting of a metallocene-alumoxane catalyst immobilized on a particulate porous support or carrier. In accordance with the present invention, physical properties of the catalyst and its support strongly influence the catalyst performance.

The term "polymerisation catalyst" and "catalyst" are used herein as synonym. As used herein, the polymerization catalyst is a free-flowing and particulate catalyst structure in a form comprising dry particles. The polymerisation catalyst can be considered as consisting of a population of catalyst particles. This population of catalyst particles can be divided in essentially two fractions (also named two parts or two subpopulations). Catalyst particles belonging to a first fraction are herein denoted as a "first fraction catalyst"; while catalyst particles belonging to a second fraction are herein denoted as a "second fraction catalyst". The term "fraction catalyst" therefore refers to catalyst particles that belong to or that are categorised in a fraction (part) of the polymerisation catalyst.

In an embodiment, the support or carrier is an inert organic or inorganic solid, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica support.

The support is a particulate porous support and can be considered as consisting of a population of support particles. In analogy with the catalyst referred to above, this population of support particles can be divided in essentially two fractions too. Support particles belonging to a first fraction are herein denoted as a "first fraction support"; while support particles belonging to a second fraction are herein denoted as a "second fraction support". The term "fraction support" therefore refers to support particles that belong to or that are categorised in a fraction (part) of the polymerisation catalyst.

Prior to its use, if desired, the support material may be subjected to a heat treatment and/or chemical treatment to reduce the water content or the hydroxyl content of the support material. Typical thermal pretreatments are carried out at a temperature from 30 to 1000° C. for a duration of 10 minutes to 50 hours in an inert atmosphere or under reduced pressure.

In an embodiment, the present invention provides a polymerization process wherein a polymerization catalyst is used comprising a particulate porous support that consists of a first fraction support and a second fraction support. According to a particular embodiment, said first fraction support differs from said second fraction support in at least one physical parameter selected from the group comprising median particle diameter, average pore diameter, average pore volume, and surface area. These physical parameters as well as the methods used for measuring these parameters are well known in the art of porous supports and will therefore not be described in detail herein.

In an embodiment, said first fraction support has a median particle diameter which is significantly different from the median particle diameter of the second fraction support.

The "median particle diameter" of a support as used herein essentially refers to the particle diameter of the support for which fifty percent of the particles has a diameter lower than the given value. This parameter can be measured by laser diffraction analysis on a Malvern type analyser after having put the support in suspension in a solvent.

In a particular embodiment, a process is provided wherein the difference between the median particle diameter of said first fraction support and the median particle diameter of said second fraction support is at least 15 µm, and for example at least 20 µm, at least 30 µm, or at least 40 µm.

In other embodiments, the support of a polymerization catalyst as defined herein has one or more of the following properties.

In an embodiment a process is provided wherein the difference between the average pore diameter of said first fraction support and the average pore diameter of said second fraction support is at least 30 Angstrom, and for instance at least 50 Angstrom or at least 75 Angstrom.

In another embodiment a process is provided wherein the difference between the average pore volume of said first fraction support and the average pore volume of said second fraction support is at least 0.2 ml/g, and for example at least 0.5 ml/g, at least 0.75 ml/g, or at least 1 ml/g.

In yet another embodiment a process is provided wherein the difference between the surface area of said first fraction support and the surface area of said second fraction support is at least 100 m$^2$/g, and for example at least 150 m$^2$/g or at least 250 m$^2$/g.

Considering the above embodiments, the present process permits to provide bimodal polyethylene having a desired molecular weight distribution and showing improved miscibility of the individual polyethylene components by carefully selecting the physical properties of the first fraction support and of the second fraction support. The relative amounts of first catalyst fraction and second catalyst fraction in the total polymerization catalyst depend upon the desired properties of the final bimodal resin. The weight ratio of said first to said second fraction catalyst in said polymerization catalyst, or in other words the weight ratio of said first to said second fraction support in said polymerization catalyst, may be comprised between 90/10 and 10/90, and may for instance comprise about 50/50.

In another embodiment, the present invention provides a polymerization process wherein a polymerization catalyst is used that consists of a first fraction catalyst and a second fraction catalyst whereby said first fraction catalyst and said second fraction catalyst have a same type of catalytically active site, but whereby said first fraction catalyst physically differs from said second fraction catalyst.

In a preferred embodiment, a process is provided wherein said first fraction catalyst differs from said second fraction catalyst in median particle diameter. The "median particle diameter" or "d50" of a catalyst as used herein essentially refer to a same parameter and refer to the particle diameter of the catalyst for which fifty percent of the particles has a diameter lower than the d50. The catalyst's d50 is generally measured by laser diffraction analysis on a Malvern type analyser after having put the catalyst in suspension in a solvent such as e.g. cyclohexane.

In an embodiment, the difference between the median particle diameter of said first fraction catalyst and the median particle diameter of said second fraction catalyst is at least 15 μm, and for example at least 20 μm, at least 30 μm, or at least 40 μm.

In another embedment, the invention provides a process for preparing a bimodal polyethylene product in a single loop reactor as given above, wherein said polymerization catalyst applied in this process is prepared by a process comprising the steps of:

preparing said particulate porous support comprising a first fraction support and a second fraction support wherein said first fraction support differs from said second fraction support in at least one physical parameter, preferably selected from the group comprising median particle diameter, average pore diameter, average pore volume, and surface area as given herein;

activating said particulate porous support by reacting said particulate porous support with alumoxane; and reacting said activated particulate porous support with a metallocene.

Reference will now be made to the catalyst applied in the process according to the invention. The term "catalyst" as used herein, is defined as a substance that causes a change in the rate of a chemical reaction without itself being consumed in the reaction. The term "polymerisation catalyst" and "catalyst" may be considered herein as synonyms. The catalysts used in the invention are metallocene-based catalysts.

As used herein, the term "metallocene" refers to a transition metal complex with a coordinated structure, consisting of a metal atom bonded to one or more ligands. The metallocenes which are used according to the invention are represented by formula (I) or (II):

$$(Ar)_2MQ_2 \quad (I); or$$

$$R''(Ar)_2MQ_2 \quad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, fluorine and chlorine are preferred.

In accordance with the present invention, a process is provided wherein ethylene monomer is polymerised in the presence of a bridged or non-bridged metallocene. "Bridged metallocenes" as used herein, are metallocenes in which the two aromatic transition metal ligands, denoted as Ar in formula (I) and (II) (i.e. the two cyclopentadienyl, indenyl, tetrahydroindenyl or fluorenyl groups) are covalently linked or connected by means of a structural bridge. Such structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

In a preferred embodiment, the metallocenes which are used in a process according to the invention are represented by formula (I) or (II) as given above,
wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms as defined herein, and a hydrocarbyl having 1 to 20 carbon atoms as defined herein;
wherein M is as defined above, and preferably is zirconium, wherein Q is as defined above, and preferably both Q are the same and are selected from the group consisting of chloride, fluoride and methyl, and preferably are chloride; and
wherein R" when present, is as defined above and preferably is selected from the group consisting of a $C_1$-$C_{20}$ alkylene, and a silicon, and wherein said R" is optionally substituted with one or more substituents each independently selected from the group consisting of a halogen, a hydrosilyl, a $SiR_3$ group wherein R is a hydrocarbyl having 1 to 20 carbon atoms as defined herein, and a hydrocarbyl having 1 to 20 carbon atoms as defined herein.

In another preferred embodiment, the metallocenes which are used in a process according to the invention are represented by formula (I) or (II) as given above,
wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms as defined herein, and a hydrocarbyl having 1 to 20 carbon atoms as defined herein;
wherein M is as defined above, and preferably is zirconium, wherein Q is as defined above, and preferably both Q are the same and are selected from the group consisting of chloride, fluoride and methyl, and preferably are chloride; and
wherein R" when present is as defined above and preferably is selected from the group consisting of a $C_1$-$C_{20}$ alkylene, and a silicon, and wherein said R" is optionally substituted with one or more substituents each independently selected from the group consisting of a halogen, a hydrosilyl, a $SiR_3$ group wherein R is a hydrocarbyl having 1 to 20 carbon atoms as defined herein, and a hydrocarbyl having 1 to 20 carbon atoms as defined herein.

In an embodiment, the invention provides a process wherein said metallocene is an unbridged metallocene.

In a preferred embodiment the invention provides a process wherein said metallocene is an unbridged metallocene of formula (I)

$$(Ar)_2MQ_2 \tag{I}$$

wherein said two Ar that are bound to M are the same and are selected from the group consisting of cyclopentadienyl, indenyl, and tetrahydroindenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium; and
wherein both Q are the same and are selected from the group consisting of chloride, fluoride and methyl, and preferably are chloride.

In a preferred embodiment, the invention provides a process wherein said metallocene is an unbridged metallocene selected from the group comprising bis(iso-butylcyclopentadienyl) zirconium dichloride, bis(pentamethylcyclopentadienyl) zirconium dichloride, bis(tetrahydroindenyl) zirconium dichloride, bis(indenyl) zirconium dichloride, bis(1,3-dimethylcyclopentadienyl) zirconium dichloride, bis(methylcyclopentadienyl) zirconium dichloride, bis(n-butylcyclopentadienyl) zirconium dichloride, and bis(cyclopentadienyl) zirconium dichloride; and preferably selected from the group comprising bis(cyclopentadienyl) zirconium dichloride, bis(tetrahydroindenyl) zirconium dichloride, bis(indenyl) zirconium dichloride, and bis(n-butyl-cyclopentadienyl) zirconium dichloride.

In another embodiment, the invention provides a process wherein said metallocene is a bridged metallocene.

In a preferred embodiment the invention provides a process wherein said metallocene is an bridged metallocene of formula (II)

$$R"(Ar)_2MQ_2 \tag{II}$$

wherein said two Ar that are bound to M are the same and are selected from the group consisting of cyclopentadienyl, indenyl, and tetrahydroindenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium;
wherein both Q are the same and are selected from the group consisting of chloride, fluoride and methyl, and preferably are chloride, and
wherein R" is selected from the group consisting of a $C_1$-$C_{20}$ alkylene, and a silicon, and wherein said R" is optionally substituted with one or more substituents each independently selected from the group consisting of a halogen, and a hydrocarbyl having 1 to 20 carbon atoms as defined herein.

In a preferred embodiment, the invention provides a process wherein said metallocene is a bridged metallocene selected from the group comprising ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, dimethylsilylene bis(2-methyl-1H-cyclopenta[a]naphthalen-3-yl) zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride.

In another preferred embodiment the invention provides a process wherein said metallocene is an bridged metallocene of formula (II)

$$R"(Ar)_2MQ_2 \tag{II}$$

wherein said two Ar that are bound to M are different and are selected from the group consisting of cyclopentadienyl and fluorenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium;

wherein both Q are the same and are selected from the group consisting of chloride, fluoride and methyl, and preferably are chloride, and wherein R" is selected from the group consisting of a $C_1$-$C_{20}$ alkylene, and a silicon, and wherein said R" is optionally substituted with one or more substituents each independently selected from the group consisting of a halogen, and a hydrocarbyl having 1 to 20 carbon atoms as defined herein.

In another preferred embodiment, the invention provides a process wherein said metallocene is a bridged metallocene selected from the group comprising diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl) zirconium dichloride, diphenylmethylene (cyclopentadienyl) (fluoren-9-yl) zirconium dichloride, dimethylmethylene (cyclopentadienyl)(2,7-ditert-butyl-fluoren-9-yl) zirconium dichloride, dimethylmethylene[1-(4-tert-butyl-2-methyl-cyclopentadienyl)](fluoren-9-yl) zirconium dichloride, diphenylmethylene[1-(4-tert-butyl-2-methyl-cyclopentadienyl)] (2,7-ditert-butyl-fluoren-9-yl) zirconium dichloride, dimethylmethylene[1-(4-tert-butyl-2-methyl-cyclopentadienyl)] (3,6-ditert-butyl-fluoren-9-yl) zirconium dichloride and dimethylmethylene (cyclopentadienyl)(fluoren-9-yl) zirconium dichloride.

Metallocene compounds used in accordance with the present invention are immobilised on a support in the presence of an activating agent. In a preferred embodiment, alumoxane is used as an activating agent for the metallocene. The alumoxane can be used in conjunction with a catalyst in order to improve the activity of the catalyst during the polymerization reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

$$R-(Al(R)-O)_x-AlR_2 \qquad (III)$$

for oligomeric, linear alumoxanes; or $$(-Al(R)-O-)_y \qquad (IV)$$

for oligomeric, cyclic alumoxanes
wherein x is 1-40, and preferably 10-20;
wherein y is 3-40, and preferably 3-20; and
wherein each R is independently selected from a $C_1$-$C_8$ alkyl, and preferably is methyl.

In a preferred embodiment, the alumoxane is methylalumoxane. Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

In a particular embodiment, the invention provides a process wherein the molar ratio of aluminum, provided by the alumoxane, to transition metal, provided by the metallocene, of the polymerization catalyst is between 10 and 1000, and for instance between 50 and 500, or between 100 and 150.

The invention claimed is:

1. A process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a particulate porous support, wherein said metallocene-alumoxane catalyst comprises only one transition metal, wherein said particulate porous support consists of a first fraction support and a second fraction support, and wherein said first fraction support differs from said second fraction support in at least one physical parameter selected from the group consisting of median particle diameter, average pore diameter, average pore volume, and surface area.

2. Process according to claim 1, wherein said particulate porous support is a particulate porous silica support.

3. Process according to claim 1, wherein the difference between the average pore diameter of said first fraction support and the average pore diameter of said second fraction support is at least 30 Angstrom.

4. Process according to claim 1, wherein the difference between the average pore volume of said first fraction support and the average pore volume of said second fraction support is at least 0.2 ml/g.

5. Process according to claim 1, wherein the difference between the surface area of said first fraction support and the surface area of said second fraction support is at least 100 m²/g.

6. Process according to claim 1, wherein said single heterogeneous polymerization catalyst is prepared by a process comprising the steps of:

preparing said particulate porous support comprising the first fraction support and the second fraction support;

activating said particulate porous support by reacting said particulate porous support with alumoxane; and reacting said activated particulate porous support with a metallocene.

7. Process according to claim 1, wherein said alumoxane has formula (III) or (IV)

$$R-(Al(R)-O)_x-AlR_2 \qquad (III)$$

for oligomeric, linear alumoxanes; or $$(-Al(R)-O-)_y \qquad (IV)$$

for oligomeric, cyclic alumoxanes wherein x is 1-40, y is 3-40, and each R is independently selected from a $C_1$-$C_8$ alkyl.

8. Process according to claim 1, wherein said metallocene-alumoxane catalyst comprises the transition metal zirconium.

9. Process according to claim 1, wherein said alumoxane is methylalumoxane.

10. A process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a particulate porous support, wherein said metallocene-alumoxane catalyst comprises only one transition metal, wherein said particulate porous support consists of a first fraction support and a second fraction support, and wherein said first fraction support differs from said second fraction support in at least one physical parameter;

wherein the difference between the median particle diameter of said first fraction support and the median particle diameter of said second fraction support is at least 15 µm.

11. A process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a particulate porous support, wherein said metallocene-alumoxane catalyst comprises only one transition metal, wherein said particulate porous support consists of a first fraction support and a second fraction support, and wherein said first fraction support differs from said second fraction support in at least one physical parameter;

wherein said metallocene-alumoxane catalyst consists of a first fraction catalyst and a second fraction catalyst and wherein said first fraction catalyst differs from said second fraction catalyst in median particle diameter.

12. Process according to claim 11, wherein the difference between the median particle diameter of said first fraction catalyst and the median particle diameter of said second fraction catalyst is at least 15 μm.

13. A process for preparing a bimodal polyethylene product in a single loop reactor, comprising polymerizing ethylene monomer and optionally one or more olefin co-monomers in the presence of a single heterogeneous polymerization catalyst consisting of a metallocene-alumoxane catalyst immobilized on a particulate porous support, wherein said metallocene-alumoxane catalyst comprises only one transition metal, wherein said particulate porous support consists of a first fraction support and a second fraction support, and wherein said first fraction support differs from said second fraction support in at least one physical parameter;

wherein said metallocene has formula (I) or (II)

$$(Ar)_2MQ_2 \qquad (I)$$

for non-bridged metallocenes; or $$R''(Ar)_2MQ_2 \qquad (II)$$

for bridged metallocenes wherein each Ar is independently selected from the group consisting of cyclopentadienyl, indenyl, tetrahydroindenyl, and fluorenyl; and wherein Ar is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group consisting of B, Si, S, O, F, Cl, and P;

wherein M is a transition metal selected from the group consisting of titanium, zirconium, hafnium and vanadium;

wherein each Q is independently selected from the group consisting of halogen; a hydrocarboxy having 1 to 20 carbon atoms; and a hydrocarbyl having 1 to 20 carbon atoms wherein said hydrocarbyl optionally contains one or more atoms selected from the group consisting of B, Si, S, O, F, Cl and P;

wherein R'' is a bridge between the two Ar and selected from the group consisting of a $C_1$-$C_{20}$ alkylene, a germanium, a silicon, a siloxane, an alkylphosphine and an amine, wherein said R'' is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group consisting of B, Si, S, O, F, Cl and P.

* * * * *